Sept. 17, 1968  L. R. BELLAH ET AL  3,401,483
BUOYANT TRAVELING DEVICE
Filed Oct. 8, 1965  2 Sheets-Sheet 1

LESTER R. BELLAH
WILLIAM H. BELLAH
INVENTORS.

BY W. E. Beatty

ATTORNEY

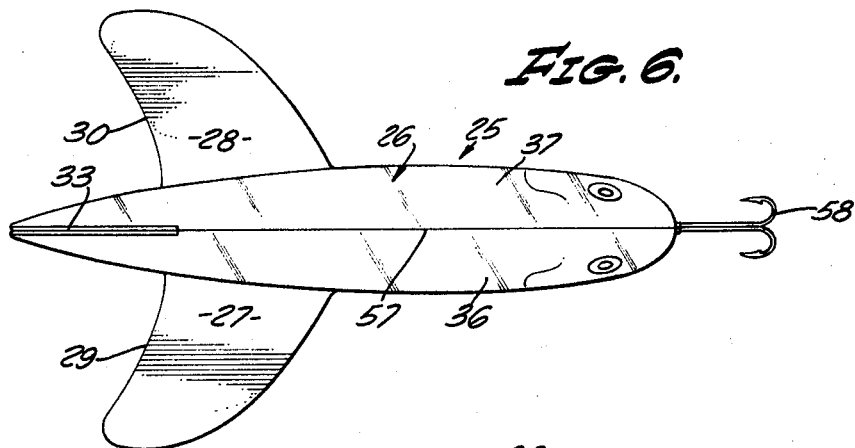
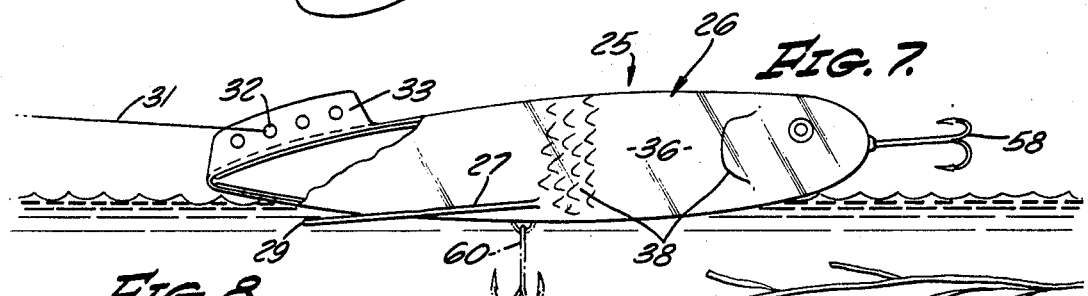
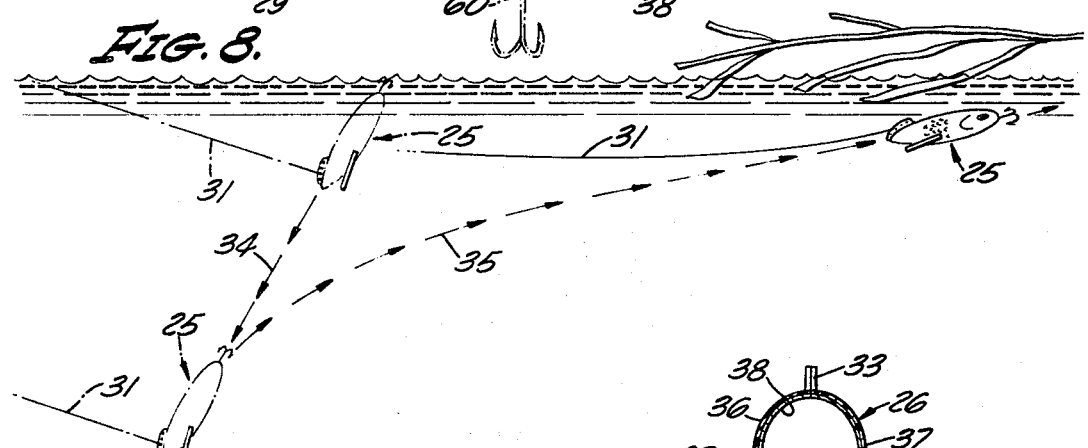
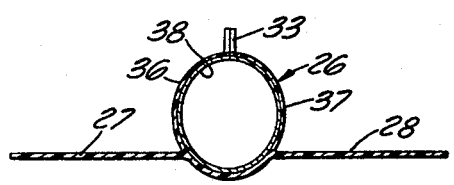
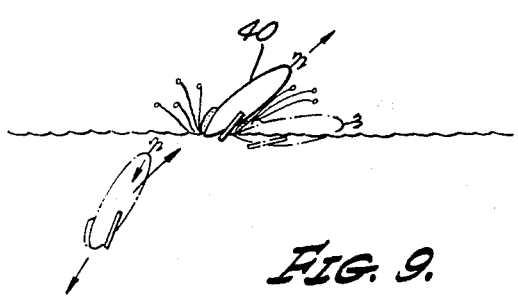
LESTER R. BELLAH
WILLIAM H. BELLAH
INVENTORS.
BY W. E. Beatty
ATTORNEY United States Patent Office 3,401,483
Patented Sept. 17, 1968

3,401,483
BUOYANT TRAVELING DEVICE
Lester R. Bellah, North Hollywood, and William H. Bellah, Los Angeles, Calif., assignors to Travelure, Inc., Los Angeles, Calif., a corporation of California
Filed Oct. 8, 1965, Ser. No. 494,076
7 Claims. (Cl. 43—42.39)

ABSTRACT OF THE DISCLOSURE

The invention relates to buoyant traveling devices useful as a bobber or as a lure, the device including a planing surface and a weight distribution directly beneath a line attachment means. In both forms, the device makes a steep dive in the water in a direction toward the fisherman when the fishing line is pulled or tugged, the device gliding upwardly and in the opposite direction away from the fisherman when the line is released, retreating to a greater distance beyond its initial position than the distance it was moved to cause it to dive.

The invention relates to a buoyant traveling device particularly useful as a fishing lure or as a carrier for a fishing lure, or leader and hook.

An object of the invention is to provide a device of the character described which is propelled solely due to the buoyancy of the device when the device is released from a submerged position.

A further object of the invention is to provide a device of the character described which will dive at a steep angle to a depth in the water, when pulled, or jerked, by a line, the device rising to an angle of approach with a small angle to the horizontal and gliding under the action of buoyancy to a distant point.

A further object of the invention is to provide a device of the character described which can be made to dive to considerable depth in the water, at a selected distance from the operator, by successively pulling, or jerking, on a fishing line and releasing it.

A further object is to provide a buoyant device which is propelled by its buoyancy, when released from a submerged position, the device gliding to a distant point while trailing a fishing line, and wherein the fishing line may be employed to steer the direction of travel.

In one form of the invention, the device will turn over from a steep diving angle to a shallow angle of approach in a very short time whereby the device will travel to a point which is distant from the point at which it started to dive.

In another form of the invention, the device will turn over from a steep diving angle to a shallow angle of approach, whereby the device will not only travel to a distant point but also may be made to leap out of the water by successively pulling the line to submerge it to a short distance and then releasing the line.

A number of modifications are possible. For example, foam plastic, weighing about 2½ lbs. per cu. ft. may be employed as the body of the device, also other light material, such as balsa wood, may be employed, although the device may be hollow.

The device may have a marking, or dressing, which simulates a fish, or minnow, or other bait item which would be attractive to fish, or the device may be used as a carrier for a fishing line, that is a leader and hooks. Also, hooks may be attached to the device when used as a lure.

Also, the device may be made in various sizes. For use in a fresh water lake, for example, the device shown in FIG. 1 may be of the order of three inches in diameter whereas for ocean use it may be substantially larger, for example, up to six inches in diameter.

In the forms of invention, described above, the fishing line, when the device is released from a submerged position, acts as a ballast or sea anchor to prevent sidesway whereby the force of buoyancy, acting on the planing surface of the device, serves to direct the device forwardly in substantially a straight line.

For further details of the invention reference may be made to the drawings wherein.

Figure 4:
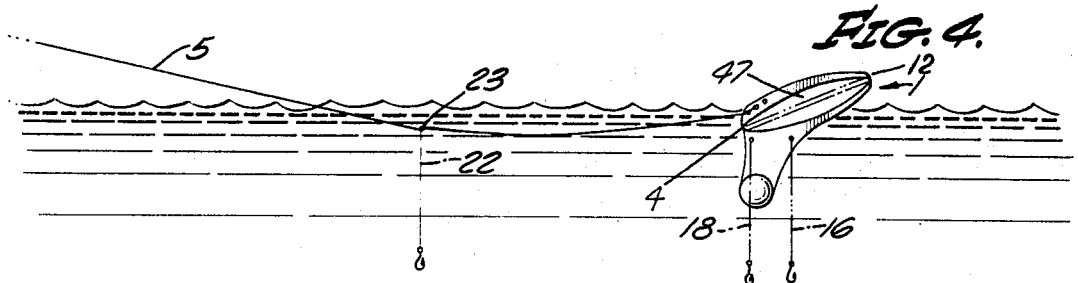
FIG. 4 is a schematic view showing the device of FIG. 1 floating on the water.
Figure 5:
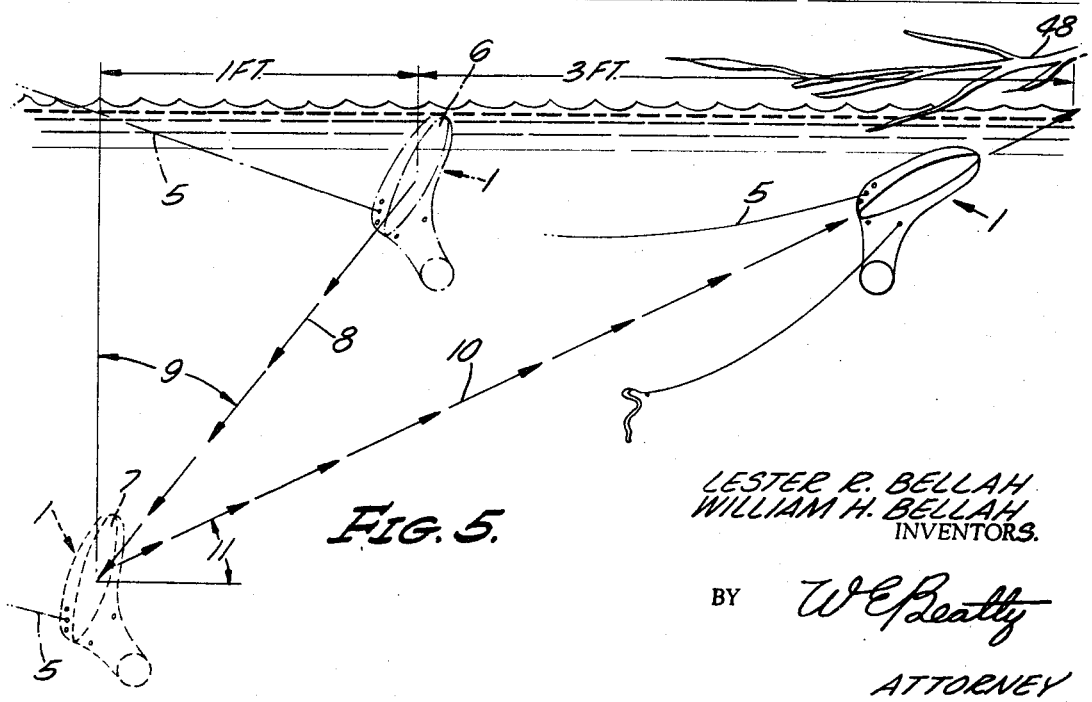

FIG. 5 is a schematic view like FIG. 4, the left hand portion of which shows the device starting its dive in response to a pull on the fishing line and the dotted line showing the submerged position to which it extends. The arrows show the path to the submerged position, and also the travel from the submerged position towards the surface, illustrating that the device advances, or progresses, to a point which is distant from the point at which it started its dive.

FIG. 6 is a plan view of a modified form of the device wherein the body is provided with laterally extending wings and has markings representing a minnow, or fish, and with fishing hooks attached thereto.

FIG. 7 is a side view in elevation, partly in section, of the device of FIG. 6, showing the device resting on the water and showing the location of the fins, or planing surfaces with their rear edges wetted by the water to facilitate diving, as illustrated in FIG. 8, in response to a pull on the fishing line.

FIG. 8 is a view showing the path of the device of FIGS. 6 and 7 from its floating position on the water to a submerged position and from the latter along a path towards the surface.

FIG. 9 illustrates the leaping action of the device of FIGS. 6–8 when submerged a short distance under the water and then released.

FIG. 10 is a typical sectional view through the body and planing surfaces of the device of FIGS. 6–9.

Referring in detail to the darwings, the device 1 in FIGS. 1–5 comprises a somewhat disk-shaped hollow body 1' which may, for example, be about three inches in diameter and have a downwardly and forwardly extending keel 2, the lower end of which has a ballast, or weight 3, of lead. The body 1' and its weight 3 may have a total weight of 23 grams of which the weight 3 weighs 13 grams, the remainder of the device weighing 10 grams. The device in FIGS. 1–5 may be a unitary molding of foam plastic, having a usual skin which results from such molding. Such foam plastic is well known, polystyrene, being cheaper, whereas polyurethane foam being stronger. Either one, or balsa wood may be used as a body of the device in FIGS. 1–5, or the body may be hollow and formed of two shells 41 and 42 of polyvinyl plastic with a vertical parting line and meeting edges cemented together with suitable plastic cement. The top edges 43, 43' form the fin 13. The flat meeting surfaces 44, 44' form the keel 2 in FIG. 1 and have a pocket 45 for the weight or ballast 46.

Figure 1:
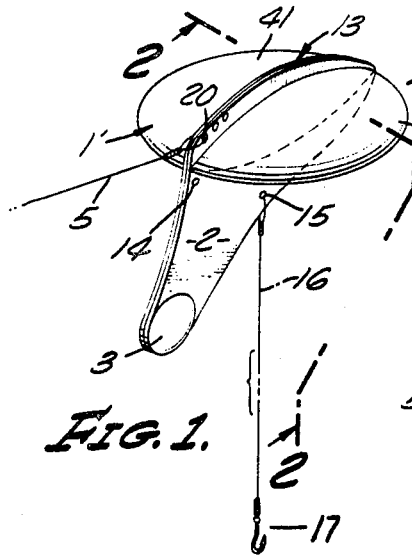
FIG. 1 is a perspective view of one form of the device having a floating body and keel acting as a carrier for a leader and fishing hook.

As seen in FIG. 4, the device of FIG. 1 has a center of gravity which is at the front of the body 1' substantially at the rear edge of the weight 3 and due to the buoyant action of the water, the device rests in a tilted position, shown in FIG. 4. In this case, the body 1 itself serves as the planing surfaces, one on each side of the body, and the front edge 4 of the body 1, as shown in FIG. 4, is wetted, that is it extends slightly under the surface of the water when the device is idle and floating on the surface of the water. This feature is quite important as it insures that, when there is a pull on the fishing line 5, the device, instead of skipping on the top of the water, will tilt forwardly and dive from the broken line position, shown at 6 in FIG. 5, to the submerged position, shown in the dotted line at 7, taking somewhat the path indicated at 8 which is at a steep angle, as indicated by the angle 9. Upon releasing the pull on the fishing line 5, the device, due to weight 3 and due to its buoyancy, tilts back and travels somewhat along the path indicated at 10 with the device proceeding along a small angle to the horizontal, as indicated at 11. The device thus proceeds to the surface until it reaches the floating position 47 in FIG. 4, and in so doing the device travels outwardly from the operator, a distance which is somewhat removed from the point indicated at 6 where the device started its dive. For example, as shown in FIG. 5, it has been found that, if the fishing line is pulled, or jerked, to cause the device 1 to submerge to a depth of three ft., it will lose one ft. of distance in a horizontal direction and glide rearwardly four ft. when the pull on the line is released, making a net gain of three ft. of travel away from the operator. This action can be repeated to cause the device 1 to travel away from the operator as far as desired. This action may be used by a fisherman to travel the device 1 into proximity with brush or the like, indicated at 48 at the shoreline, with little danger of entangling the device or its hooks. In other words, the device may be made to tow the fishing line outwardly by successively pulling, or jerking, on the line to submerge the device and then releasing the line. This action has been demonstrated by actual use of both forms of the device illustrated.

The keel 2 and the upper fin 13 serve somewhat to guide the device in a straight line although it has been found that the principal guiding is due to the action of the fishing line 5, when released, as this acts as a drag to prevent sideway of the body when it is proceeding along the path, indicated at 10 in FIG. 5.

The keel 2 may have suitable apertures, indicated at 14 and 15 for attaching thereto a leader like 16, having one or more fishing hooks, like 17. A similar leader indicated at 18 in FIG. 4 may be provided for the aperture 14.

The fishing line 5 is attached to an aperture indicated at 20 in FIG. 1. The point of attachment 20 of the fishing line 5 to the device is such that when the fishing line 5 is pulled, the device is tilted towards the upright position causing the planing surface 50, 51, provided by the body 1' of the device, on meeting the resistance of the water, to dive at a steep angle, as described in connection with FIG. 5. Several apertures are shown in FIG. 1 in fin 13. They were used in a preliminary model for determining the point 20 for best action. The finished model only needs one aperture like 20 at the proper location.

As indicated in FIG. 4, a dropper indicated at 22 may be attached to the line 5, the point 23 of its attachment being distant from the device sufficiently so that the hook of the dropper 22 will not entangle with the other hooks.

The paragraph headings below apply to both forms of the device.

Diving

If pulled at sufficient speed, enough pressure is created against planing surfaces like 50, 51, FIGS. 1–5 and 27, 28, FIGS. 6–10, to overcome the buoyant force and result in an angle of dive determined by point of line attachment, area of planing surfaces as related to buoyancy, angle of line in relation to surface of water and speed with which device is pulled.

The nature of the dive, whether shallow or deep and whether near or far with respect to the fisherman, are matters of choice. For example, the device may be made to dive and prior to reaching the surface, dive again so that the device travels to a distance without reaching the surface of the water. The device can be operated to make a deep dive or a shallow dive at any suitable distance from the operator.

Unless sufficient speed is applied to create the necessary pressures to overcome buoyancy, device will travel at or near surface of water. This allows retrieval of device.

Point of line attachment

Holes for attachment of line have been located through experimentation to give near maximum dive angle and minimize the effect of line drag on glide angle when device is released.

Operator's skill

Basic operation is simple and can easily be learned in a matter of a few minutes by anyone familiar with fishing tackle, generally. Setting of reel brake to rip off the proper length of line when diving pull is exerted is not too difficult. Ripping off line by hand is actually more difficult. This assumes that device is allowed to surface at the end of each glide.

Somewhat more practice is required to travel device under water, that is without permitting device to break surface of water during travel. More brake friction is required for this maneuver and the line must be watched to observe when slack has been taken up. If line cannot be readily observed, pole is returned to position from which diving pull was begun and tug of device after line slack has been taken up will signal time for next pull.

Jumping lure out of water, as explained in connection with FIGS. 6–10, simply requires a sharp, short jerk at the right time and should be mastered with ease.

A slightly more difficult maneuver which lengthens the glide of lure, requires that a strong pull for diving be ended gently; this results in a change in the center of pressure which hastens the assumption of lure's glide angle.

Shape

Figure 2:
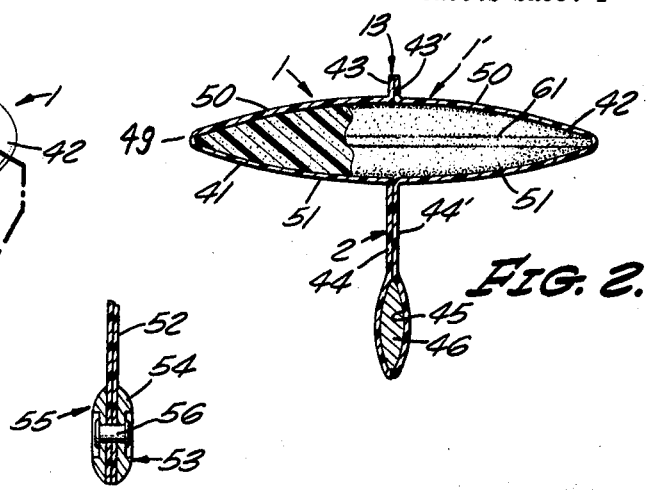
FIG. 2 is an enlarged sectional view on broken line 2–2 of FIG. 1 through the body and keel of FIG. 1.
Figure 3:
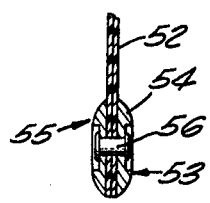
FIG. 3 is a partial sectional view showing a preferred form of securing the weight to the item of FIG. 1.

The shape of the body 1' in FIGS. 1–5 may be referred to as a disk in the sense that this means discus, or more particularly, lenticular, like a lentil, or double convex lens. The periphery 49 is circular, but this is not critical. As shown in FIG. 2, the body 1' is symmetrical about a horizontal plane at right angles to the plane of the drawing, through the periphery, the upper surface 50 being half on each shell 41, 42, and the lower surface 51 likewise being half on each shell. The surfaces 50, 51 are planing surfaces and while shown as similar and elliptical, may be similar or different and of other shapes such as spherical or flattened, the altitude of each shell at the parting line at fin 13 being small in proportion to the diameter of the periphery 49.

While experiments have been made with various shapes, the two models, FIGS. 1 and 6, meet the functions desired as well as any others used.

However, as an example of the effect of a change in shape, experiments were made with a disk flat on the bottom and a flattened dome shape on top. Because of the pressure caused by the domed top, the weight, like 46, for balance had to be placed far to the front. This item worked well but not any better than model in FIG. 1, and because of the long shape (8 or 9 inches), it would require much room in the tackle box.

Alternative form

Alternatively, the lure should look somewhat like a fish, as in FIGS. 6–10, with the line connection at the tail of the fish. With transparency to disguise the wings 27, 28, and simulated body markings 38, this will have been accomplished, to a degree. However, if spinners are desired, some shifts in buoyancy and line placement may be necessary.

Steering

Steering can be accomplished by using the fishing rod to flip the line to one side or the other of a straight line to the device to correspondingly steer the device, as the fishing line acts as a drag and the device tends to align itself with the direction of that drag.

Speed

Tests have been made to determine the speed of the device 1 of 3 inches in diameter and a double size, 6 inches in diameter. It has been found that the larger one travels at the rate of 100 feet per minute, including diving time, whereas the smaller one travels at a rate of 1 foot per second, including diving time. The higher speed of the larger one is accounted for by the fact that doubling the size increases the buoyancy and the volume 8 times with an increase of surface only 4 times. In the above tests, the devices each towed a fishing line used to cause the device to dive, as explained above.

Weight

Preferably, the device should not weigh more than 50% of the weight of an equal volume of water. The speed of travel is reduced as the weight is increased.

Modifications

In addition to the modifications described above, as shown in FIG. 3, the weight 46 of FIG. 2 may be in the form shown at 53, having opposed halves 54, 55, clamped to the outside of the flat keel 52 by a rivet 56.

In the form shown in FIG. 6, the device 25 has a body 26, somewhat cigar-shaped and circular in cross section, as shown in FIG. 10. For example, it may be 4¾ inches long and weigh 9 grams including the weight of the transparent planing surfaces 27, 28, which are similar and arranged on opposite sides of the longitudinal axis of the body 25. The body 25 is, for example, hollow. The surfaces 27 and 28 are arranged below the center of the body 25, as apparent from FIGS. 7 and 10. Also, the surfaces 27 and 28 extend rearwardly of the center of the body 25 and the rear edges 29 and 30 of these surfaces are wetted by the water, as shown in FIG. 7. The surfaces 27 and 28 are flat and inclined upwardly at a slight angle to the horizontal when the device is resting on the water. The fishing line is attached to an aperture 32 in a vertical and stabilizing fin 33 at the upper rear portion of the body 26. The point of attachment 32 is such that when there is a pull on the line 31, the nose of the device 25 is tilted upwardly and the planing surfaces 27 and 28 dig into the water, so to speak, causing the device to make a steep dive as indicated at 34 in FIG 8. On releasing the tension in the line 31, the body 25 assumes, or starts to assume, its horizontal position, shown in FIG. 7. Due to its buoyancy, the planing surfaces 27 and 28 are causing the device to glide as indicated on the path 35 in an upward direction. The device 25 proceeds upwardly on a somewhat smooth curve, as shown, due to the fact that it moves slowly from its lowermost position, when its nose is tilted up, towards its floating position with its nose pointing horizontally. In comparison to the device in FIG. 5, the latter, when the tension in the fishing line is released at the submerged position, this device 1 almost immediately, or within its length, tilts with its rear 12 down to a more nearly horizontal position taking less time to turn over from its steep diving angle to its shallow gliding angle along its path 10. As a result of this difference, the device 25 in FIG. 6 can be made to leap out of the water, by pulling or jerking on the line, an amount sufficient to submerge the device slightly, and then releasing the line, the device, or body 25, instead of turning down from its upwardly tilted position proceeds practically along the same path that it had when it dove and as shown at 40 in FIG. 9, the device 25 leaps out of the water. This action can be repeated at short intervals by pulling, or jerking, on the line and releasing it, causing the body 25 to repeatedly leap out of the water which may be an attractive action for certain types of fish when using the device as a fishing lure.

One reason why the device 25 in FIGS. 6 and 7 dives into the water when there is a pull on the fishing line 31 is because of the fact that the resistance to such motion is offered by the rear portions 29 and 30 of the planing surface which are at this time acting as the leading portions of the surfaces due to the fact that the device is moving rearwardly and in consequence of the fact that such leading portions, 29 and 30, are opposed in their motion by the water into which they dip. Thus, we could draw a line from the point of attachment 32 to the portions 29 and 30 of the planing surfaces to represent the line of resistance to the rearward motion of the body 25 and as the line 31 is above that point of resistance a pull on the line 31 acts to cause the surfaces 27 and 28 to dig into the water and cause the device to dive at a steep angle, as described. The shape of the surfaces 27 and 28 in FIG. 6 does not seem to be critical as various other shapes have been used with equal success. The above explanation as to why the device 25 dives into the water when there is a pull on the fishing line 31 applies in general to the device 1 in FIG. 1 although its action, specifically, is somewhat different due to the presence of the weight, or ballast, 3. Also, one reason why the device 1 in FIG. 1 turns over from the position with its rear up to its rear somewhat horizontal in a much shorter interval of time than the device 25 in FIG. 6 is because of the restoring influence of ballast. This pull on the device 1 is, of course, opposed by the body of water in front of it which creates a higher pressure on the front or top of the device than on its opposite side. The result is that when this pull on the line 5 is released, for example after the device 1 has descended to a position shown in FIG. 5, the greater pressure on the surface 50 of the device acts to tilt it with its nose moving in a clockwise direction, as seen in FIG. 5, so that its rear thus assumes a horizontal direction more quickly than the device in FIGS. 6 and 7.

In FIG. 10, the body 26 is hollow and composed of two shells 36, 37, of plastic as described in connection with FIG. 2, having a vertical parting line with their meeting edges cemented together, after inserting a declacomania, having a design 38, representative of a minnow, as shown in FIG. 7, the shells 36 and 37 and their planing surfaces 27, 28, being transparent. The surface 27 is cast integral with shell 36 and surface 28 is cast integral with shell 37. The top meeting edges form the fin 33 in FIG. 7.

In FIGS. 6–10, the body 26 is hollow and made of two plastic shells cemented together on parting line 57. A plastic Xmas tree ornament has been used, in which case the surface or wings 27, 28, are cemented in place, although they can be molded integral with the body. As the fin 33 and wings 27, 28, are off center, they assist in tilting the device 25 with nose 19 up when floating, as shown in FIG. 7. The front hook 58 is suitably fastened to the nose 19 and may be rigid, as shown in FIGS. 6 and 7, or pendant with an eye, as shown at 59 for the belly hook 60. The hook 60 can be at or aft of the center of gravity to either (a) not affect the tilt of 27, 28, when floating, or (b) assist the tilt.

Whether the body is made or filled with foam plastic, the body has a weight in air of the order of ¹⁄₁₅ the weight of displaced water, when submerged.

In FIGS. 1–5, the shells 41, 42, may be fitted over a unitary core 61 of a molding of foam plastic and then these shells are cemented together, as shown. This helps align the shells in the course of assembly and adds strength for depths of 50 feet, or more.

As a modification of the rigging in FIGS. 1–5, we may dispense with the leaders 16 and 18 and dropper 22 and their hooks, and instead, the fishing line 5, which may be of nylon and quite flexible, may pass freely through the aperture 20, the lower portion of this line having a sinker larger than aperture 20. Below the sinker is secured a leader and one or more hooks like 16, 18 or 22. After the body has been caused to travel a desired distance, as described above, release of the line permits the sinker with its hook and bait to drop to the bottom of the body of water. The buoyant body thus acts as a carrier and as a float to indicate or show the location where the bottom is being fished. A further advance is that the body puts a drag on the line to reduce the likelihood that a hooked fish, such as a croaker, will run towards the fisherman to put slack in the line faster than it can be taken up and throw the hook.

The form in FIG. 1, 4 inches in diameter, has been used in a bay. This had a strong pull and took out 300 ft. of the line in a short time. This suggests use of the device for life saving purposes by omitting the fishing tackle and securing a capsule containing an inflatable life saving garment or support to one of the apertures shown.

The device is thus useful as a carrier for fishing purposes or other purposes, also as a float, or as a fishing device or lure.

We claim:

1. A buoyant traveling device comprising a buoyant body having a first line attachment portion and said body having an opposite portion, means for attaching a line to said first portion, said body having an upwardly facing planing surface and a weight distribution substantially centered directly beneath said line attachment portion and inclining said surface upwardly toward said opposite portion when said body is idle and floating on water, said planing surface having a first edge below said first portion and an opposite elevated edge, said first edge being wetted by the water when said body is floating on water, said planing surface acting when the line is pulled to cause said body to dive to a submerged position at a steep angle to the horizontal when tilted forwardly and with a certain horizontal component, and when the line is slackened, said body having a horizontal component of greater extent in the opposite direction while rising with said weight distribution, said weight distribution urging said planing surface to face upwardly at a lesser angle to the horizontal when released from said submerged position, the hydraulic pressure acting on said upwardly facing planing surface preventing said body from rising directly vertically to the surface from the submerged position.

2. A buoyant traveling device according to claim 1 wherein said weight distribution comprises a weight substantially directly beneath said line attachment portion, said body rising with said planing surface at a lesser angle to the horizontal when released from said submerged position due to the buoyancy of said body and to the action of said weight spaced from and arranged below said body which causes said planing surface to have said upward inclination when said body is idle and further urging said planing surface to face upwardly with a reduction in said certain angle when the line tension is released at the submerged position, the buoyancy of said body being insufficient to cause said body to rise directly vertically to the surface from the submerged position due to hydraulic pressure acting on said planing surface facing upwardly under action of said weight.

3. A buoyant traveling device according to claim 2, said body acting as a float for fishing purposes and having a support extending below said body, said support having said weight and means for attaching a terminal leader and hook device.

4. A buoyant traveling device according to claim 1, said body having a dressing acting as a lure and having a hook device.

5. A buoyant traveling device according to claim 2, said body being in lenticular form, a keel below said body, said keel having a lower portion having said weight acting to incline said body as recited, said body having an upper surface acting as said planing surface.

6. A buoyant traveling device according to claim 2, said body being in lenticular form having opposing shells having edges cemented together, certain of said edges being at the top of said body and acting to guide said body in substantially a straight line when released from the submerged position, others of said edges extending from the bottom of said body and forming a keel having a weight below said first portion of said body.

7. A buoyant traveling device according to claim 2, said body being in lenticular form having opposing shells having edges cemented together, certain of said edges being at the top of said body and acting to guide said body in substantially a straight line when released from the submerged position, others of said edges extending from the bottom of said body and forming a keel having a pocket below said first portion of said body, and a weight in said pocket.

References Cited

UNITED STATES PATENTS

| 849,367 | 4/1907 | Burke | 43—43.1 X |
| 1,202,631 | 10/1916 | Winnie | 43—42.47 |
| 1,272,003 | 7/1918 | Cameron | 43—42.39 X |
| 2,186,780 | 1/1940 | De Witt | 43—42.39 X |
| 2,235,868 | 3/1941 | Coolidge et al. | 43—43.13 |
| 2,767,504 | 10/1956 | Atkinson | 43—43.13 |
| 2,976,642 | 3/1961 | Wickman et al. | 43—43.13 |

SAMUEL KOREN, *Primary Examiner.*

J. H. CZERWONKY, *Assistant Examiner.*